United States Patent [19]
Kozawa et al.

[11] Patent Number: 5,958,623
[45] Date of Patent: Sep. 28, 1999

[54] ELECTROCHEMICAL CELL EMPLOYING A FINE CARBON ADDITIVE

[76] Inventors: Akiya Kozawa, 39 Youke, Ukino, Chiakicho, Ichinomiya-shi, Aichi-ken, 491, Japan; Shunzo Mase, 435 Motokinogo, Tobishimamura, Ama-gun, Aichi-ken, 490-14, Japan; Atsushi Sato, 4-313 Gokuraku, Meitouku, Nagoya-shi, Aichi-ken, 465, Japan

[21] Appl. No.: 08/826,681

[22] Filed: Apr. 7, 1997

[30] Foreign Application Priority Data

Dec. 13, 1996 [JP] Japan .................................. 8-359471
Dec. 28, 1996 [JP] Japan .................................. 8-359986
Jan. 27, 1997 [JP] Japan .................................. 9-049564
Feb. 4, 1997 [JP] Japan .................................. 9-058243

[51] Int. Cl.$^6$ ...................................................... H01M 4/02
[52] U.S. Cl. .................. 429/231.8; 429/212; 429/231.1; 429/231.4; 429/229; 429/224; 429/231.95; 429/223; 429/225

[58] Field of Search ...................................... 429/192, 198, 429/206, 218, 224, 225, 229, 218.1, 231.8, 231.1, 231.4, 212, 231.95, 223

[56] References Cited

U.S. PATENT DOCUMENTS

| | | | |
|---|---|---|---|
| 3,891,457 | 6/1975 | Auborn | 136/6 |
| 4,614,696 | 9/1986 | Ito | 429/222 |
| 5,019,467 | 5/1991 | Fujiwara | 429/127 |
| 5,798,189 | 8/1998 | Hayashida | 429/101 |

*Primary Examiner*—Maria Nuzzolillo
*Assistant Examiner*—Monique M. Wills

[57] ABSTRACT

An electrochemical cell such as a lead acid cell, wherein fine carbon particles with or without an organic material is disposed in the electrolyte of the cell, deposited on the surface of the electrically active material of the cell and/or dispersed within the electrically active material of the cell.

19 Claims, 5 Drawing Sheets

ELECTROCHEMICAL CELL EMPLOYING A FINE CARBON ADDITIVE

FIELD OF THE INVENTION

This invention relates to electrochemical cells, such as rechargeable cells, using ultra-fine carbon articles with or without an organic material dispersed in the electrolyte of the cell, deposited on the surface of the electrochemically active material of the cell and/or dispersed with the electrochemically active material of the cell.

BACKGROUND OF THE INVENTION

Many different types of additives have been employed in electrochemical cells for various reasons such as to increase the capacity of the cell, reduce the internal resistance of the cell, and for rechargeable cells, provide quick charge capabilities. Colloidal graphites have been found to be a good additive for lead-acid batteries. It is reported that the colloidal graphite can extend the capacity and cycle life of a lead-acid battery.

It is an important object of the invention to provide an electrochemical cell with increased capacity for a fixed size volume and to reduce the internal resistance of the cell using an additive of organic fine carbon or ultra-fine carbon material.

It is another object of the invention to provide rechargeable electrochemical cells with quick charge capability using organic fine carbon material as a layer on the electrochemically active material and/or disposed in the electrolyte of the cell.

It is another object of this invention to provide a relatively inexpensive additive of organic fine carbon material or ultra-fine carbon particles (1) for use in an electrochemical cell to increase the cell's capacity and reduce its internal resistance and (2) for use in a rechargeable electrochemical cell to provide quick charge capability.

SUMMARY OF THE INVENTION

In one embodiment of the invention, the invention relates to an electrochemical cell comprising an electrochemically active material and an electrolyte wherein the improvement being organic fine carbon material disposed onto the electrochemically active material, dispersed within the electrochemically active material, and/or within the electrolyte and preferably the organic fine carbon material in the cell having an average size of the carbon particles between about 0.01 to 0.08 $\mu$m, preferably between about 0.02 to 0.05 $\mu$m, and the average size of the organic fine carbon material being between about 0.08 to 0.3 $\mu$m, preferably between 0.09 to 0.2 $\mu$m and most preferably about 0.15 $\mu$m.

Another embodiment of the invention relates to a process for producing an organic fine carbon material for use in electrochemical cells comprising the steps:

(a) producing a pasty mixture containing carbon particles, preferably long carbon chains made from carbon black, sized between about 0.01 to about 0.08 $\mu$m and organic polymer material in an aqueous or non-aqueous liquid; and (b) grinding the pasty mixture with a sufficient force, preferably a shear force, to produce a suitably homogeneous organic fine carbon material sized between about 0.08 to about 0.3 $\mu$m.

The carbon for use in this invention is preferably carbon black and/or acetylene black. Acetylene black and carbon black can be produced from acetylene gas by thermal decomposition in the form of a chain structure containing particles sized between the range recited above. Preferably, the carbon chains are cut to a length of between about 0.01 to 0.30 $\mu$m, preferably between 0.15 to 0.30 $\mu$m. Preferably, long chains of carbon black and large organic polymer molecules are mixed to make a paste with a proper amount of a liquid (water or organic solvent) and then the paste solution is disposed in a roller mill where the shear force of the roller will grind the paste to an average size between about 0.08 to 0.3 $\mu$m, preferably about 0.15 $\mu$m.

The fine carbon particles and organic material can be ground using a roller mill operation technique using the chopped carbon chains, the organic material and a suitable liquid, such as water. The mixture is ground to produce an organic fine carbon material having a size between about 0.09 to 0.20 $\mu$m and preferably about 0.15 $\mu$m. The shear force of the roll elements of the grinding device can be used to produce a suitable substantially homogeneous organic fine carbon material in a distribution and size as recited in this application.

Suitable organic materials are hydrophilic organic materials. Carbon black and acetylene black used in batteries are hydrophobic (non-wetting to aqueous solution). In one embodiment the fine carbon particles in a chain type structure are mixed with and bond with a hydrophilic organic material to form colloid organic fine carbon material in a range referred to above. A preferred embodiment of this invention is shown as follows:

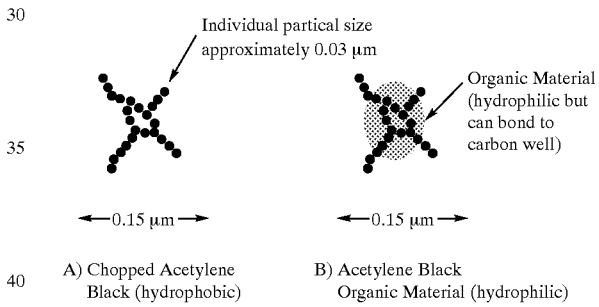

A) Chopped Acetylene Black (hydrophobic)

B) Acetylene Black Organic Material (hydrophilic)

The organic fine carbon material is very stable in the cell's environment while still maintaining good conductive characteristics provided the amount of the organic material is sufficient to impart hydrophilic characteristics to the organic fine carbon material. Preferably, the ratio of the carbon to organic material can be between 100% to 10% and 100% to 60%, most preferably between 100% to 30% and 100% to 60%. In the preferred embodiment, the suspension solution for producing the organic fine carbon material could contain between 1.0% and 20% of the solid material (carbon and organic polymer) and most preferably about 10% of the solid material. The organic fine carbon material can be ground to a small size (in the range recited above) which is unique in its size and distribution compared to commercial size carbon particles.

Suitable organic materials for use in this invention are polyvinyl alcohol (PVA), preferably of low molecular weight PVA; polyvinyl pyrolydone; animal skin and bone products marketed in Japan as Nikawa; CMC (carbon, methyl cellulose) gum arabic and casein. The preferred organic polymer material is polyvinyl alcohol. The colloidal hydrophilic organic fine carbon material is ideally suited to be dispersed in an aqueous solution in electrochemical cells and/or on the electrochemically active material of the cells. Preferably, the amount of the organic materials (such as PVA) can be in an amount between about 10% to 100% by weight of the carbon. The amount of the organic material should be sufficient to form a combined colloidal material with the carbon to provide the necessary hydrophilic property to the colloidal material to form a stable dispersion of the organic fine carbon in a solution while maintaining sufficient carbon to provide a conduction layer on the cell's electrochemically active materials such as $MnO_2$, Zn, $Ni(OH)_2$, MH (metal hydride) for alkaline cells; $LiMn_2O_4$; SnOx, $LiNiO_2$, $LiCuO_2$ and their modification for Li-ion cells and $PbSO_4$, PbOx, $PbO_2$ and Pb powder for lead acid cells. The use of the organic material can effectively reduce oxidation of the carbon on the electrochemically active material such as $PbO_2$ in comparison to a system employing only carbon alone. One of the main functions of the fine carbon is to produce a conductive layer on an electrochemically active material. Preferably, the layer thickeners and the electrochemically active material can be between about 0.02 $\mu m$ and 0.8 $\mu m$; and most preferably about 0.3 $\mu m$. When the electrochemically active material is in the form of particles, such as $MnO_2$ particles, then the size of the particles can be any suitable size and preferably between about 5 to 50 $\mu m$.

Since the size of the organic fine carbon material is small, it can be packed with the particles of the active material and thereby provide more space for the active components of the cell. It is believed that the cell's capacity can be increased by 15% or greater. Also, the surface layer on the active material becomes conductive and thereby the cell's impedance (internal resistance) is reduced. For rechargeable cells, the cells can be charged fast since they can be charged at a greater current. For rechargeable cells, the particles of the active material can maintain good electrical contact even when the particles of the active material expand and contract upon repeated charge-discharge cycles.

Electrochemically active material made of particles 5 to 50 $\mu m$ in diameter, such as $MnO_2$; $LiCoO_2$; NiOOH; MH alloys; SnOx; PbOx before formation in lead-acid batteries; and the like can preferably be coated with the organic fine carbon material by mixing 1 to 15%, preferably between 5 to 10%, of organic fine carbon material in water or organic solvent (such as N-methyl pyrolydone for Li-Ion cells) to produce a slurry and then heating to between 120° to 750° C. in nitrogen or vacuum to remove the liquid. The organic fine carbon material layer can vary in thickness to a desired thickness depending on the cell system using the electrochemically active material. In many cases, the slurry can be used without heating. For lead acid batteries, the electrolyte is generally $H_2SO_4$ (S.G. specific gravity—1.28) and a preferably stable colloidal organic fine carbon suspension in solution (about 1 to 20% of solid carbon and organic material in water) can be added by 5 to 20% by volume to the electrolyte where the organic fine carbon material can be adsorbed on the surface of the active material of the cell. One function of the organic fine carbon material is to produce a conductive layer on a non-conductive $PbSO_4$ electrode. The benefits of the organic material in conjunction with carbon are as discussed above.

EXAMPLE 1

Figure 1:
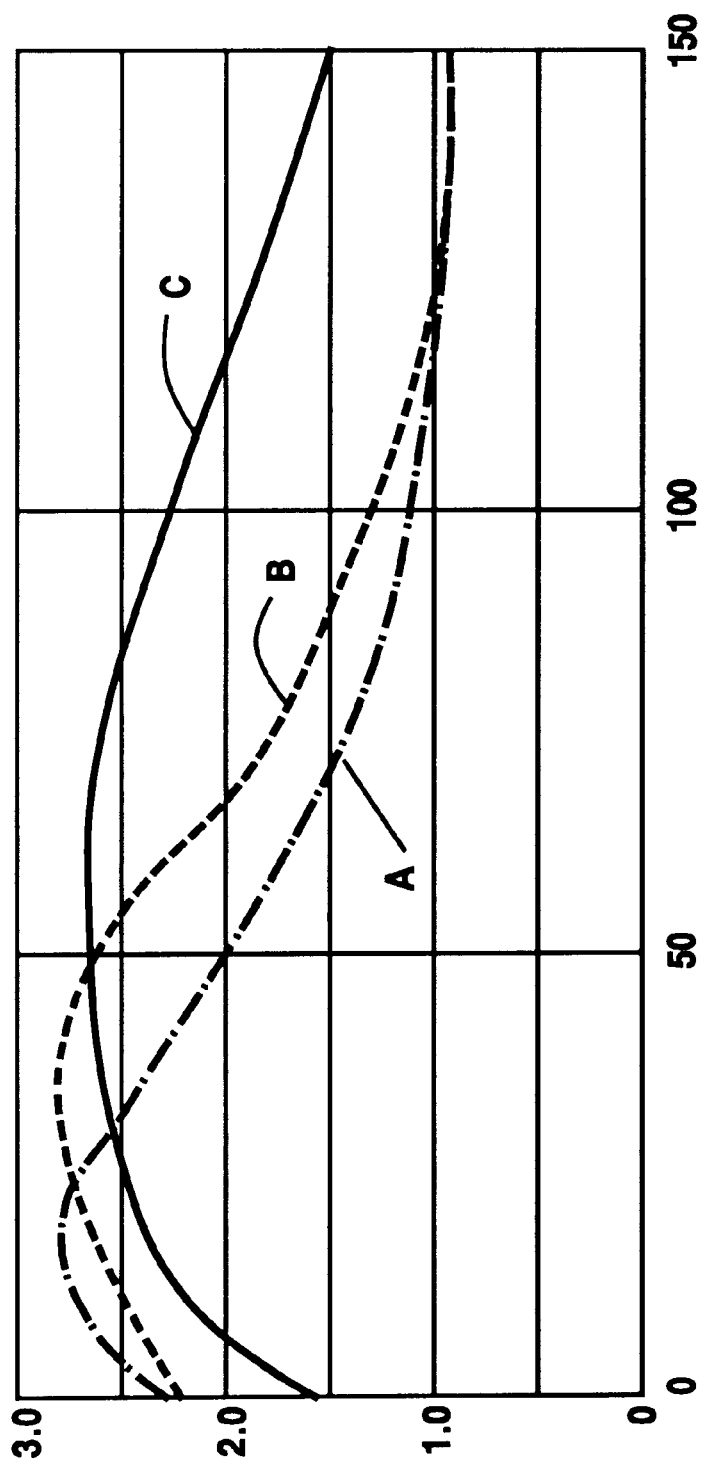
FIG. 1 is a graph of a plot of AH capacity to reach 1.0V cut-off (hr) versus cycles of several lead acid batteries.

Organic fine carbon material was produced by preparing a paste of solid components of carbon chain particles and organic polymer of PVA dispersed in water. The paste was dispersed in water to make a solution and the solution was ground in a roller mill devise in which the solution was subject to shear force from revolving wheels or drums to produce organic fine carbon material of a size of about 0.15 $\mu m$. A mixture of 10% solid organic fine carbon material sized about 0.15 $\mu m$ (UFC) was dispersed in a solution such as an acid and alkaline solution. Table 1 shows the dispersion of the 10% solid organic fine carbon suspension in various liquids. Solutions were tested to check if any of the solid organic fine carbon material precipitated. The tests revealed that none of the solutions had any precipitation of the organic fine carbon material.

TABLE 1

Stability of UFC-Organic Colloid

| | | Time after mixing (A) and (B) | | |
|---|---|---|---|---|
| *(A) | *(B) | 30 min | 180 min | 24 hrs |
| 0.1N $H_2SO_4$ | UFC (10% solid) colloid suspension | **NO | NO | NO |
| 4.0 $H_2SO_4$ | UFC (10% solid) colloid suspension | NO | NO | NO |
| $H_2O$ | UFC (10% solid) colloid suspension | NO | NO | NO |
| 9M KOH | UFC (10% solid) colloid suspension | NO | NO | NO |

*6% of (B) mixed in (A)
**NO means no precipitation of (B)

EXAMPLE 2

The organic fine carbon material having an average size of 0.15 $\mu m$ was produced as disclosed in Example 1 and dispersed in water along with 5 g of $MnO_2$ (electrolytic $MnO_2$) or 5 g of $LiMn_2O_2$. Various amounts of carbon were used to produce the organic fine carbon material. The solution was heated at 160° C. for one hour to remove the water. The outside surfaces of each active electrode were coated with the residuals of the solution and each coated electrode was pressed at 75 kg pressure and the impedance was measured. The data is recited in Table 2 and show that the resistance of the electrode decreases with the amount of coated carbon. The results also indicate that coated active electrodes, such as $MnO_2$, $LiMn_2O_4$, $LiCoO_2$, MH alloy, $SnO_8$, NiOOH, $Ni(OH)_2$, and the like, with the novel coating of this invention, should be effective to reduce the amount of carbon or graphite in the electrode composition.

TABLE 2

| Example | Active Material | % of Carbon | Resistance |
|---|---|---|---|
| 1 | $MnO_2$ | 3.2% | 88.2 ohms |
| 2 | $MnO_2$ | 0.6% | 174.2 ohms |
| 3 | $MnO_2$ | 0 | 535.2 ohms |
| 4 | $LiMn_2O_4$ | 3.2% | 5.4K ohms |
| 5 | $LiMn_2O_4$ | 0.6% | 11.1K ohms |
| 6 | $LiMn_2O_4$ | 0 | 12.5K ohms |

As shown in Table 2, the resistance decreased with increasing the amount of carbon in the organic fine carbon material that was coated on the surface from both $MnO_2$ and $LiMn_2O_4$ samples. This shows that the organic material (insulator) present in the organic fine carbon material does not hinder the electrical current flow since the carbon type chains (carbon to carbon contact) helps to produce a conductive layer on the surface of the electrically active materials.

EXAMPLE 3

Several lead acid batteries (4 Ah) were tested with the $H_2SO_4$ electrolyte (specific gravity 1.28) with and without additive. The batteries were all the same except that in some batteries 5 cc of the organic fine carbon material suspension solution (carbon 6 weight percent) was dispersed into 100 cc of the $H_2SO_4$ electrolyte and in other batteries graphite suspension was added. The test conditions of the 4 AH batteries were (1) discharge cell at 4 amperes to 1.0 volt; (2) charge at 1.0 amperes for 4 hours; and (3) repeat (1) and (2) four times per day. The results are shown in FIG. 1 where Sample A contained no additive; Sample B contained graphite additive (commercial product); and Sample C contained the organic fine carbon material. As shown in FIG. 1, the battery with the organic fine carbon material performed best.

EXAMPLE 4

Figure 2:
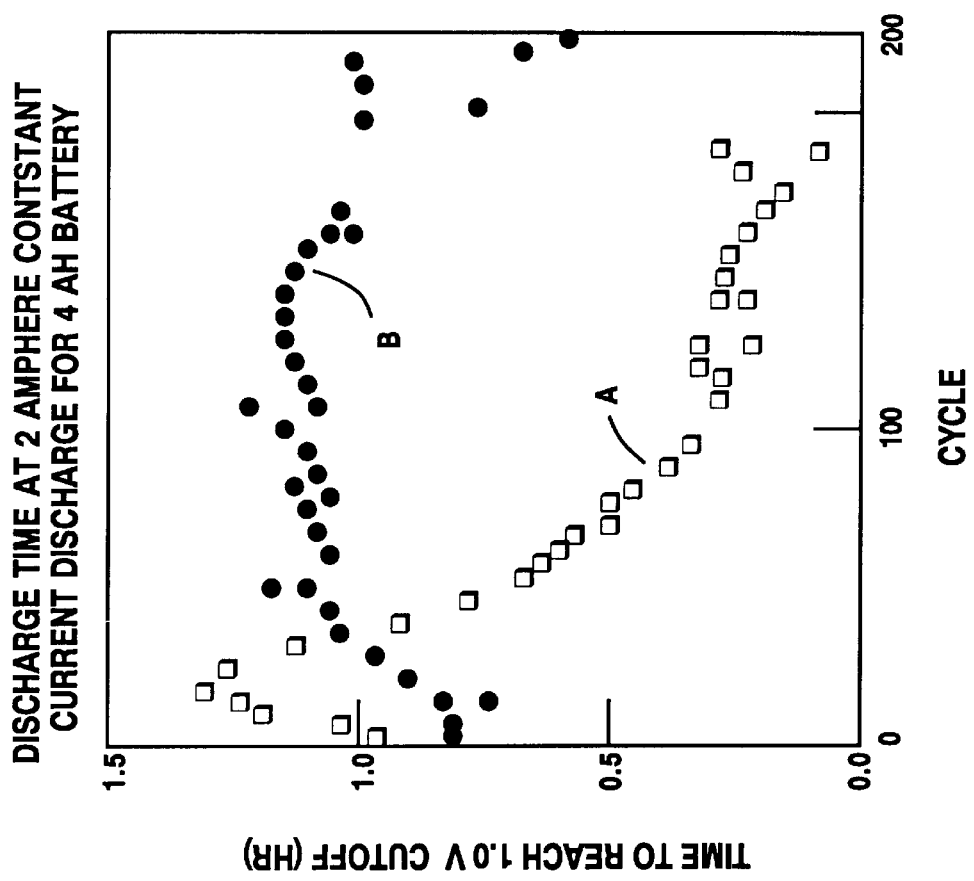
FIG. 2 is a graph of a plot of time to reach 1.0V cut-off (hr) versus cycles of two lead acid batteries.

Several lead acid batteries made in accordance with the description in Example 3 were tested in the same manner as Example 3. The results are shown in FIG. 2 where Sample A contained no additive and Sample B contained the organic fine carbon material as disclosed in Example 2. As shown in FIG. 2, the batteries with the organic fine carbon had a longer cycle life than the batteries that did not have an additive.

EXAMPLE 5

Figure 3:
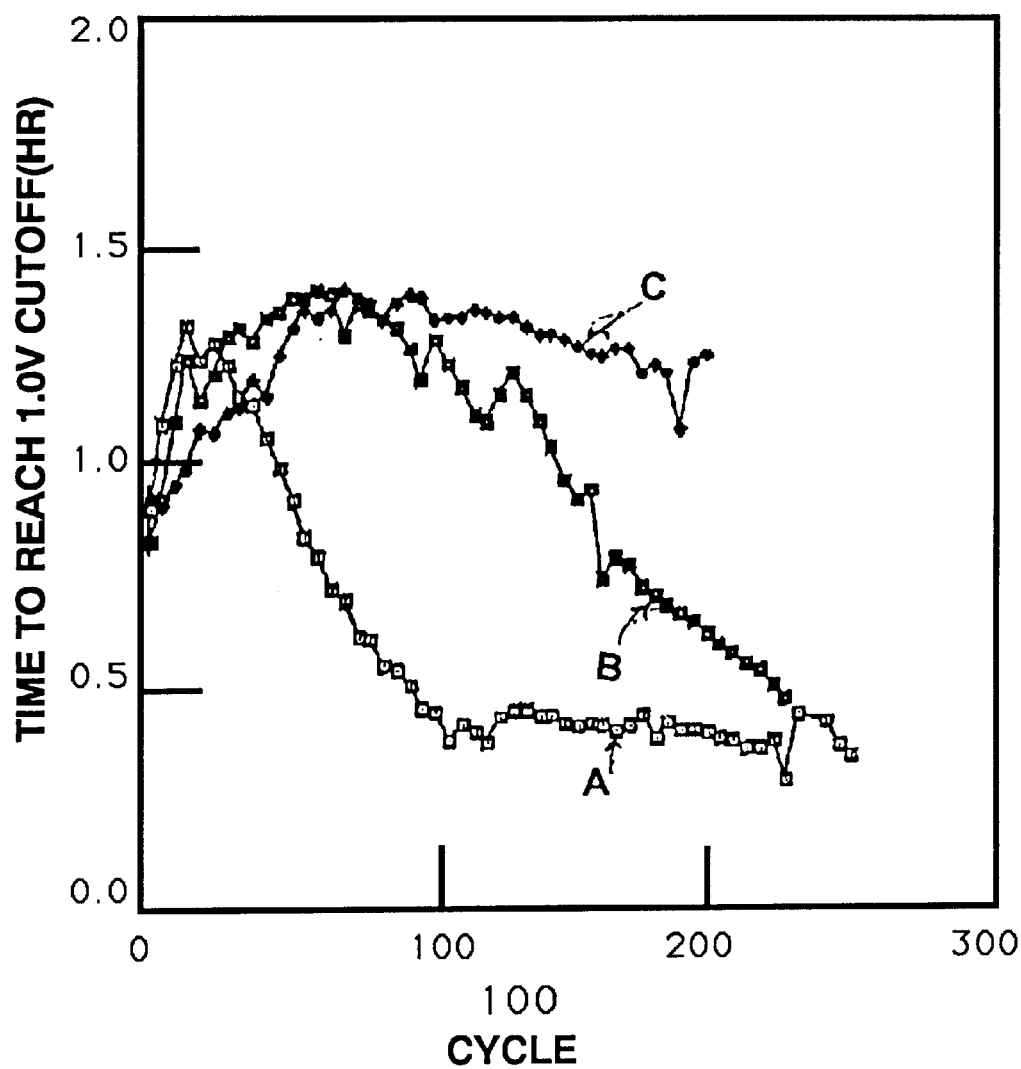
FIG. 3 is a graph of a plot of time to reach 1.0V cut-off (hr) versus cycles of two lead acid batteries.

Several lead acid batteries made in accordance with the description in Example 3 were tested in the same manner as Example 3. The results are shown in FIG. 3 where Sample A contained no additive, Sample B contained the organic fine carbon material with an amount of carbon of 0.3%, and Sample C contained the organic carbon material with an amount of carbon of 0.6%, as disclosed in Example 3. As shown in FIG. 3, the batteries with the organic carbon had a longer cycle life than the batteries that did not have an additive.

EXAMPLE 6

Figure 4:
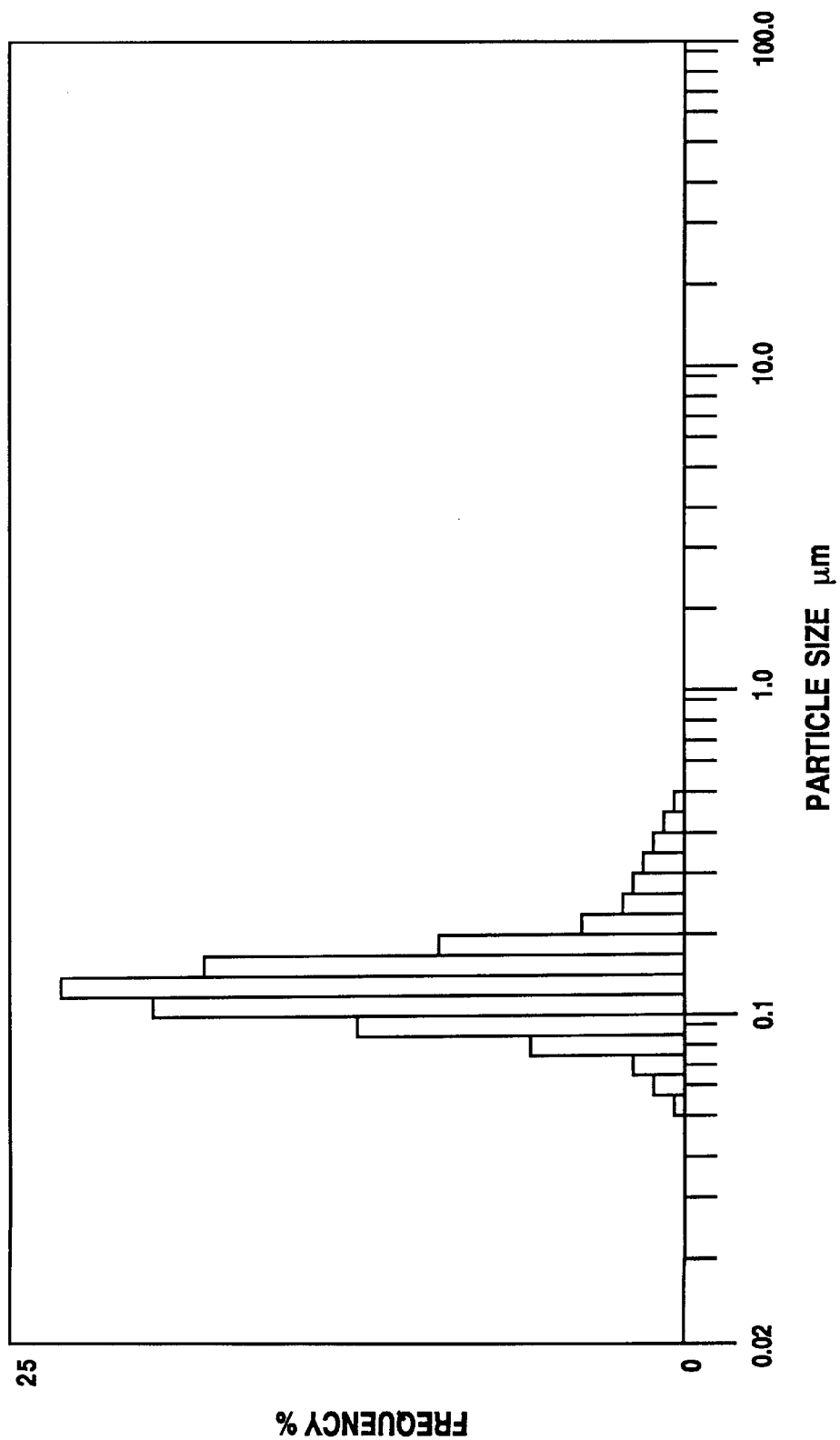
FIG. 4 is a graph of a plot of the size of the organic fine carbon material versus the frequency percentage of the distribution of the small size organic fine carbon material according to the subject invention.
Figure 5:
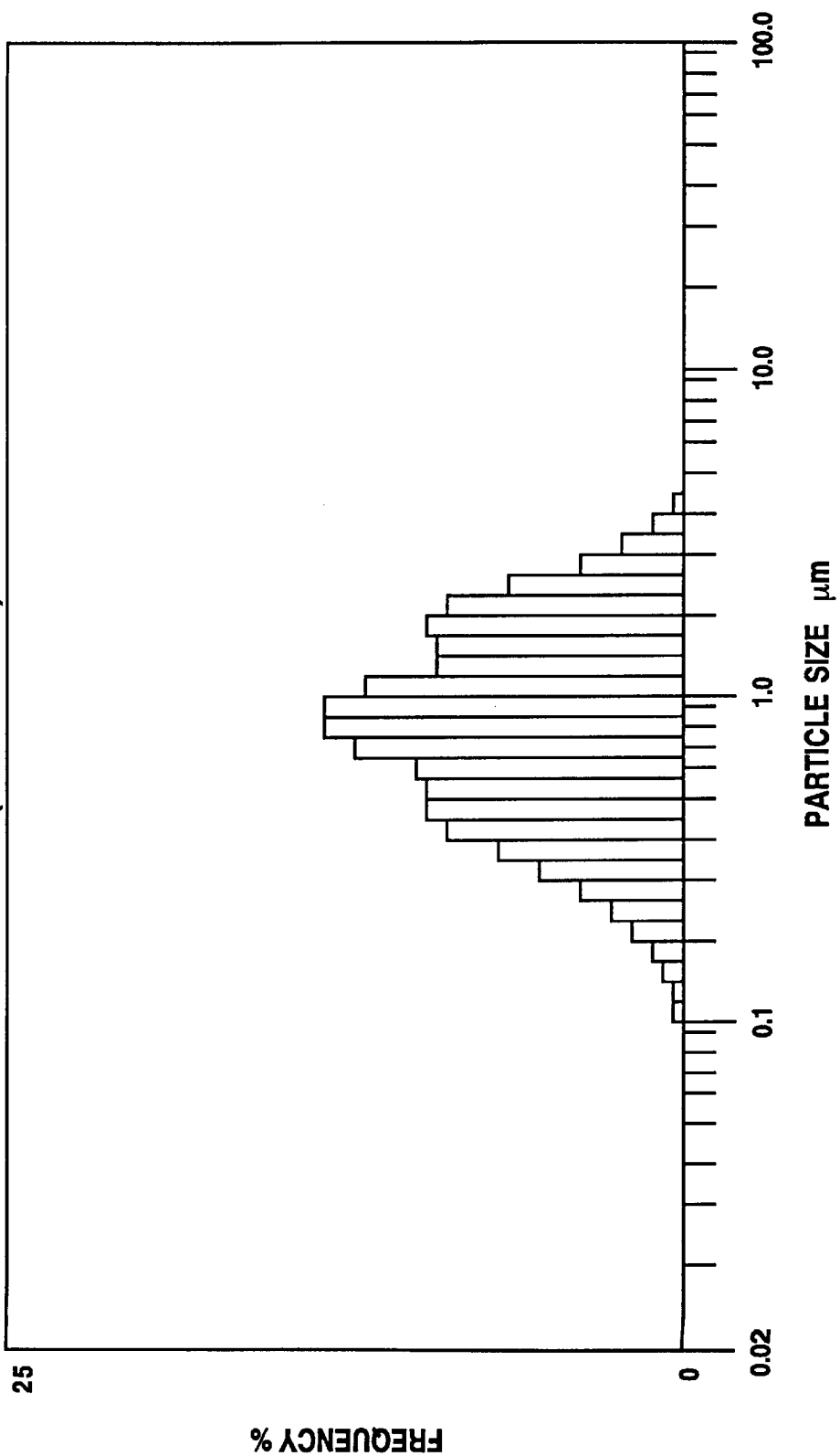
FIG. 5 is a graph of a plot of the particle size of the carbon versus the percentage distribution of the particles have been produced using an anodic oxidation technique discussed in a publication titled "The Twelfth Annual Battery Conference on Applications and Advances", Jan. 4–7, 1997, pages 277 to 282.

The particle size of the colloidal organic fine carbon material was measured by a laser diffraction unit (Horiba LA-190) and compared to the colloidal graphite (α-pholon), commercially available for lead-acid battery applications. The size of the organic fine carbon colloidal material is about 10 times smaller than the commercial product (α-pholon) as shown in FIG. 4 and FIG. 5.

The novel additive of the organic fine carbon material of this invention can be used in lead acid cells, NiCd cells, NiMN cells, Li-ion cells, alkaline manganese oxide cells and manganese oxide cells. For aqueous cell materials ($MnO_2$, $Ni(OH)_2$, Pb, $PbSO_4$, $PbO_2$, etc.) the organic fine carbon material is preferably adsorbed on the surface and produces a conductive layer. For non-aqueous Li cells, Li-ion cells, the colloidal organic fine carbon material is preferably dispersed in organic solvent or in water and coated on the surface or mixed in the slurry to be coated on aluminum or copper foil. For lead-acid cells, the active electrochemical material could be PbOx (Litherge). The organic fine carbon material can be preferably mixed in a paste containing the electrically active particle to make the pasted electrode conductive. This would allow fast formation (first charge).

In another embodiment of the invention, the ultra fine carbon, such as carbon black, could be produced from a slurry ground with shear force between rollers to produce particles having an average size less than about 0.6 μm in size and preferably less than 0.3 μm. The ultra fine particles can be used without the organic material and provide a conductive layer for the electrochemically active materials of the cell. The use of the ultra fine carbon particles can increased capacity for a cell and reduce the internal resistance of the cell.

Additional features of the invention are:

1. Use in PbOx (Litherge) or $H_2SO_4$. Lead-acid battery plates, both positive(+) and negative (−) electrodes are made of PbOx paste. The cell having PbOx electrodes for both (+) and (−) will be charged first to make $PbO_2$ for (+) and Pb for (−). The first charge is called formation and requires 15 to 24 hours since PbOx's conductivity is low and you cannot use high current. When organic fine carbon material is mixed in an amount of between 2 to 10% by weight, the formation time is substantially reduced. The formation time can be reduced to 3 to 5 hours since a high charge current is used. For this purpose, organic fine carbon material is mixed with PbOx paste and/or in the $H_2SO_4$ solution.

2. Organic fine carbon material suspension in an organic solvent or aqueous solution is applied as a coating on $LiCoO_2$, $LiNiO_2$, $LiMnO_4$ powder, carbon powder or SnOx powder for Li-ion cell material. Since these active materials become smaller powders upon repeated charge-discharge, the surface coated material can continue to contact carbon even after it becomes fine powder. Therefor utilization is kept high.

3. Organic fine carbon material suspension can be used as an additive for a used, deteriorated lead-acid battery to recover the capacity of the cell and to reduce the internal resistance of the cell, and impart longer charge-discharge cycle life to the cell.

It is to be understood that modifications and changes to the preferred embodiments of the invention herein can be made without departing from the spirit and scope of the invention.

What is claimed:

1. In an electrochemical cell comprising an electrochemically active material and an electrolyte wherein the improvement comprises an organic fine carbon composition comprising carbon and hydrophilic organic materials in the form of composite particles having a size between 0.08 to 0.3 μm and said particles are disposed within the electrochemical cell.

2. The electrochemical cell of claim 1 wherein the organic fine carbon composition forms a layer on the surface of the electrochemically active material.

3. The electrochemical cell of claim 1 wherein the organic fine carbon composition is disposed in the electrolyte of the cell.

4. The electrochemical cell of claim 1 wherein the organic fine carbon composition is dispersed within the electrochemically active material.

5. The electrochemical cell of claim 1 wherein said organic fine carbon composition in the cell has an average size between 0.08 to about 0.3 μm.

6. The electrochemical cell of claim 1 wherein the organic fine carbon composition have an average size of about 0.15 μm.

7. The electrochemical cell of claim 1 wherein the average size of the carbon particles in the organic fine carbon composition is between 0.01 to 0.08 μm and said carbon particles are in the form of chains coupled to the organic material.

8. The electrochemical cell of claim 1 wherein the organic material is selected from the group consisting of polyvinyl alcohol; polyvinyl prolydone; animal skin and bone products; carboxymethyhl cellulose; gum arabic and casein.

9. The electrochemical cell of claim 1 wherein the electrochemically active material is selected from the group consisting of Zn, $MnO_2$, $LiMn_2O_4$, $LiCoO_2$, $LiNiO_2$, $LiNiO_2$; $Ni(OH)_2$, MH alloys, Pb; $PbSO_2$; PbOx; Pb and carbon.

10. The electrochemical cell of claim 9 wherein the electrochemically active material is selected from the group consisting of $PbSO_2$, $PbO_2$, PbOx, and Pb.

11. The electrochemical cell of claim 2 wherein the surface of the electrochemically active material is coated with the organic carbon composition as a layer with a thickness of about 0.01 to about 0.8 μm.

12. The electrochemical cell of claim 1 wherein the carbon material is selected from the group consisting of acetylene black and carbon black.

13. The electrochemical cell of claim 1 wherein the electrochemical cell is selected from the group consisting of lead acid cell, NiCd cell, NiMN cell, Li-ion cell, alkaline manganese oxide cell and manganese oxide cell.

14. The electrochemical cell of claim 2 wherein the organic fine carbon composition is disposed in the electrolyte of the cell.

15. A process for producing an organic fine carbon composition comprising carbon and hydrophilic organic materials in the form of composite particles for use in electrochemical cells comprising the step of producing a pasty mixture of carbon particles sized between 0.01 to 0.08 μm and an organic polymer in a liquid and then grinding the pasty mixture with a sufficient force to produce a homogeneous organic fine carbon composition composed of carbon and organic materials in the form of composite particles sized between 0.08 to 0.3 μm.

16. The process of claim 15 wherein the force to grind the mixture is a shearing force produced by a roller mill device.

17. In an electrochemical cell comprising an electrochemically active material and an electrolyte wherein the improvement comprises ultra fine carbon particles having an average size of less than 0.08 μm and disposed on the surface of the electrochemically active material or dispersed into the electrolyte of the cell.

18. The electrochemical cell of claim 17 wherein the particles of the ultra fine carbon particles have an average size of less than 0.05 μm.

19. The electrochemical cell of claim 17 wherein the carbon is selected from the group consisting of acetylene black and carbon black.

* * * * *